United States Patent
Terry et al.

(10) Patent No.: US 7,904,026 B2
(45) Date of Patent: *Mar. 8, 2011

(54) DYNAMIC CHANNEL QUALITY MEASUREMENT PROCEDURE IMPLEMENTED IN A WIRELESS DIGITAL COMMUNICATION SYSTEM TO PRIORITIZE THE FORWARDING OF DOWNLINK DATA

(75) Inventors: Stephen E. Terry, Northport, NY (US);
Stephen G. Dick, Nesconset, NY (US);
James M. Miller, Verona, NJ (US);
Eldad Zeira, Huntington, NY (US);
Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/648,470

(22) Filed: Dec. 29, 2009

(65) Prior Publication Data

US 2010/0105337 A1 Apr. 29, 2010

Related U.S. Application Data

(63) Continuation of application No. 11/656,647, filed on Jan. 23, 2007, now Pat. No. 7,639,989, which is a continuation of application No. 10/768,312, filed on Jan. 30, 2004, now Pat. No. 7,171,163, which is a continuation of application No. 10/029,569, filed on Dec. 21, 2001, now Pat. No. 6,810,236.

(60) Provisional application No. 60/290,877, filed on May 14, 2001.

(51) Int. Cl.
*H04B 17/00* (2006.01)

(52) U.S. Cl. .................. 455/67.11; 455/452.2; 455/450; 455/509; 455/456.5; 455/62; 455/512; 370/332; 370/370; 370/335; 370/350; 370/348; 370/329

(58) Field of Classification Search ............... 455/67.11, 455/450, 452.2, 509, 62, 456.5, 512, 524; 370/332, 335, 348, 350, 329
See application file for complete search history.

(56) References Cited

U.S. PATENT DOCUMENTS 5,375,123 A 12/1994 Andersson et al.
(Continued)

FOREIGN PATENT DOCUMENTS

EP 0 755 133 1/1997
(Continued)

OTHER PUBLICATIONS

3GPP, "3rd Generation Partnership Project; Technical Specification Group Radio Access Network; Physical Layer Procedures (TDD) (Release 1999)," 3GPP TS 25.224 V3.6.0 (Mar. 2001).
(Continued)

*Primary Examiner* — Marceau Milord
(74) *Attorney, Agent, or Firm* — Volpe and Koenig, P.C.

(57) ABSTRACT

A wireless digital communication system includes a base station in communication with a plurality of user equipment mobile terminals (UEs). The system prioritizes the forwarding of blocks of downlink data to designated ones of the UEs. The system employs adaptive modulation and coding (AM&C) to achieve improved radio resource utilization and provides optimum data rates for user services. Blocks of downlink (DL) data are received by the base station which requests downlink (DL) channel quality measurements only from those mobile terminals (UEs) with pending downlink transmissions. The UEs respond to the request by measuring and reporting DL channel quality to the base station, which then allocates resources such that the UEs will make best use of radio resources. The base station notifies the UEs of the physical channel allocation indicating the modulation/coding rate and allocated slots followed by transmission of blocks of downlink data which are transmitted to the UEs.

10 Claims, 2 Drawing Sheets

U.S. PATENT DOCUMENTS

| | | | |
|---|---|---|---|
| 5,428,816 | A | 6/1995 | Barnett et al. |
| 5,701,294 | A | 12/1997 | Ward et al. |
| 5,828,672 | A | 10/1998 | Labonte et al. |
| 5,862,451 | A | 1/1999 | Grau et al. |
| 5,867,478 | A | 2/1999 | Baum et al. |
| 5,940,439 | A | 8/1999 | Kleider et al. |
| 5,949,790 | A | 9/1999 | Pehkonen et al. |
| 5,960,335 | A | 9/1999 | Umemoto et al. |
| 6,101,179 | A | 8/2000 | Soliman |
| 6,115,406 | A | 9/2000 | Mesechner |
| 6,137,991 | A | 10/2000 | Isaksson |
| 6,167,031 | A | 12/2000 | Olofsson et al. |
| 6,208,663 | B1 | 3/2001 | Schramm et al. |
| 6,298,035 | B1 | 10/2001 | Heiskala |
| 6,301,265 | B1 | 10/2001 | Kleider et al. |
| 6,307,867 | B1 | 10/2001 | Roobol et al. |
| 6,330,288 | B1 | 12/2001 | Budka et al. |
| 6,347,071 | B1 | 2/2002 | Cupo et al. |
| 6,366,601 | B1 | 4/2002 | Ghosh et al. |
| 6,373,877 | B1 | 4/2002 | Mesecher |
| 6,374,118 | B1 | 4/2002 | Toskala et al. |
| 6,381,231 | B1 | 4/2002 | Silventoinen et al. |
| 6,381,445 | B1 | 4/2002 | Ue et al. |
| 6,414,946 | B1 | 7/2002 | Satou et al. |
| 6,449,462 | B1 | 9/2002 | Gunnarsson et al. |
| 6,545,997 | B1 | 4/2003 | Bohnke et al. |
| 6,567,665 | B1 | 5/2003 | Kissee |
| 6,584,092 | B1 | 6/2003 | Sudo |
| 6,587,697 | B2 | 7/2003 | Terry et al. |
| 6,597,697 | B1 | 7/2003 | Petersen |
| 6,603,797 | B1 | 8/2003 | Zeira et al. |
| 6,615,054 | B2 | 9/2003 | Terry et al. |
| 6,631,123 | B1 | 10/2003 | Jiang et al. |
| 6,700,881 | B1 | 3/2004 | Kong et al. |
| 6,707,808 | B1 | 3/2004 | Vedrine |
| 6,721,569 | B1 | 4/2004 | Hashem et al. |
| 6,745,045 | B2 | 6/2004 | Terry et al. |
| 6,760,598 | B1 | 7/2004 | Kurjenniemi |
| 6,791,960 | B1 | 9/2004 | Song |
| 6,810,236 | B2 * | 10/2004 | Terry et al. ............... 455/67.11 |
| 6,850,540 | B1 | 2/2005 | Peisa et al. |
| 6,909,901 | B2 * | 6/2005 | Terry et al. ............... 455/452.2 |
| 6,928,065 | B2 | 8/2005 | Logalbo et al. |
| 6,934,340 | B1 | 8/2005 | Dollard |
| 6,947,490 | B1 | 9/2005 | Edwards et al. |
| 6,952,591 | B2 | 10/2005 | Budka et al. |
| 6,958,989 | B1 | 10/2005 | Dick et al. |
| 6,963,540 | B2 | 11/2005 | Choi |
| 6,987,746 | B1 | 1/2006 | Song |
| 6,990,087 | B2 | 1/2006 | Rao et al. |
| 7,035,234 | B2 | 4/2006 | Toskala et al. |
| 7,089,015 | B2 | 8/2006 | Fukui |
| 7,116,653 | B1 | 10/2006 | Bemmer et al. |
| 7,127,256 | B2 * | 10/2006 | Terry et al. ............... 455/452.2 |
| 7,171,163 | B2 * | 1/2007 | Terry et al. ............... 455/67.11 |
| 7,209,711 | B2 * | 4/2007 | Terry et al. ............... 455/67.11 |
| 7,227,854 | B2 | 6/2007 | Kim et al. |
| 7,236,474 | B2 | 6/2007 | Seo et al. |
| 7,260,405 | B2 | 8/2007 | Kim et al. |
| 7,274,947 | B2 | 9/2007 | Koo et al. |
| 7,639,989 | B2 * | 12/2009 | Terry et al. ............... 455/67.11 |

FOREIGN PATENT DOCUMENTS

| | | |
|---|---|---|
| EP | 0 964 540 | 12/1999 |
| EP | 0 986 282 | 3/2000 |
| EP | 1 024 622 | 8/2000 |
| GB | 2266433 | 10/1993 |
| KR | 20010038996 | 5/2001 |
| KR | 20010073145 | 7/2001 |
| RU | 2122288 | 11/1998 |
| RU | 2129761 | 4/1999 |
| RU | 2138915 | 9/1999 |
| RU | 2138926 | 9/1999 |
| RU | 2141726 | 11/1999 |
| RU | 2197779 | 1/2003 |
| TW | 192647 | 10/1993 |
| WO | 97/37457 | 10/1997 |
| WO | 98/03030 | 1/1998 |
| WO | 98/21910 | 5/1998 |
| WO | 99/10991 | 3/1999 |
| WO | 00/51390 | 8/2000 |
| WO | 00/72496 | 11/2000 |
| WO | 02/32179 | 4/2002 |
| WO | 02/093847 | 11/2002 |
| WO | 02/093951 | 11/2002 |
| WO | 2004/042960 | 5/2004 |

OTHER PUBLICATIONS

3GPP, "3rd Generation Partnership Project; Technical Specification Group Radio Access Network; Physical Layer Procedures (TDD) (Release 1999)," 3GPP TS 25.224 V3.8.0 (Sep. 2001).

3GPP, "3rd Generation Partnership Project; Technical Specification Group Radio Access Network; Physical Layer Procedures (TDD) (Release 4)," 3GPP TS 25.224 V4.2.0 (Sep. 2001).

3GPP, "3rd Generation Partnership Project; Technical Specification Group Radio Access Network; Physical Layer Procedures (TDD) (Release 4)," 3GPP TS 25.224 V4.0.0 (Mar. 2001).

3GPP, "3rd Generation Partnership Project; Technical Specification Group Radio Access Network; UTRA High Speed Downlink Packet Access (HSDPA); Overall description; Stage 2 (Release 5)," 3GPP TS 25.308 V5.0.0 (Sep. 2001).

3GPP, "3rd Generation Partnership Project; Technical Specification Group Radio Access Network; Physical layer procedures (FDD) (Release 4)," 3GPP TS 25.214 V4.0.0 (Mar. 2001).

3GPP, "3rd Generation Partnership Project; Technical Specification Group Radio Access Network; Physical layer procedures (FDD) (Release 1999)," 3GPP TS 25.214 V3.8.0 (Sep. 2001).

3GPP, "3rd Generation Partnership Project; Technical Specification Group Radio Access Network; Physical layer procedures (FDD) (Release 1999)," 3GPP TS 25.214 V3.6.0 (Mar. 2001).

3GPP, "3rd Generation Partnership Project; Technical Specification Group Radio Access Network; Physical layer procedures (FDD) (Release 4)," 3GPP TS 25.214 V4.2.0 (Sep. 2001).

3GPP, "3rd Generation Partnership Project; Technical Specification Group Radio Access Network; Multiplexing and channel coding (TDD) (Release 4)," 3GPP TS 25.222 V4.1.0 (Sep. 2001).

3GPP, "3rd Generation Partnership Project; Technical Specification Group Radio Access Network; Multiplexing and channel coding (TDD) (Release 4)," 3GPP TS 25.222 V4.0.0 (Mar. 2001).

3GPP, "3rd Generation Partnership Project; Technical Specification Group Radio Access Network; Multiplexing and channel coding (TDD) (Release 1999)," 3GPP TS 25.222 V3.7.0 (Sep. 2001).

3GPP, "3rd Generation Partnership Project; Technical Specification Group Radio Access Network; Multiplexing and channel coding (TDD) (Release 1999)," 3GPP TS 25.222 V3.6.0 (Mar. 2001).

3GPP, "3rd Generation Partnership Project; Technical Specification Group Radio Access Network; UTRAN lub Interface NBAP signaling (Release 1999)," 3GPP TS 25.433 V3.7.0 (Sep. 2001).

3GPP, "3rd Generation Partnership Project; Technical Specification Group Radio Access Network; UTRAN lub Interface NBAP signaling (Release 1999)," 3GPP TS 25.433 V3.5.0 (Mar. 2001).

3GPP, "3rd Generation Partnership Project; Technical Specification Group Radio Access Network; UTRAN lub Interface NBAP signaling (Release 4)," 3GPP TS 25.433 V4.0.0 (Mar. 2001).

3GPP, "3rd Generation Partnership Project; Technical Specification Group Radio Access Network; UTRAN lub Interface NBAP signaling (Release 4)," 3GPP TS 25.433 V4.2.1 (Sep. 2001).

3GPP, "3rd Generation Partnership Project; Technical Specification Group Radio Access Network; RRC Protocol Specification (Release 4)," 3GPP TS 25.331 V4.2.1 (Oct. 2001).

3GPP, "3rd Generation Partnership Project; Technical Specification Group Radio Access Network; RRC Protocol Specification (Release 1999)," 3GPP TS 25.331 V3.6.0 (Mar. 2001).

3GPP, "3rd Generation Partnership Project; Technical Specification Group Radio Access Network; RRC Protocol Specification (Release 4)," 3GPP TS 25.331 V4.0.0 (Mar. 2001).

3GPP, "3rd Generation Partnership Project; Technical Specification Group Radio Access Network; RRC Protocol Specification (Release 1999)," 3GPP TS 25.331 V3.8.0 (Sep. 2001).

3GPP, "3rd Generation Partnership Project; Technical Specification Group Radio Access Network; MAC protocol specification (Release 4)," 3GPP TS 25.321 V4.2.0 (Sep. 2001).

3GPP, "3rd Generation Partnership Project; Technical Specification Group Radio Access Network; MAC protocol specification (Release 4)," 3GPP TS 25.321 V4.0.0 (Mar. 2001).

3GPP, "3rd Generation Partnership Project; Technical Specification Group Radio Access Network; MAC protocol specification (Release 1999)," 3GPP TS 25.321 V3.9.0 (Sep. 2001).

3GPP, "3rd Generation Partnership Project; Technical Specification Group Radio Access Network; MAC protocol specification (Release 1999)," 3GPP TS 25.321 V3.7.0 (Sep. 2001).

3GPP, "3rd Generation Partnership Project; Technical Specification Group Radio Access Network; Physical Layer Procedures (TDD) (Release 1999)," 3GPP TS 25.224 V3.6.0 (Mar. 2001).

3GPP, "3rd Generation Partnership Project; Technical Specification Group Radio Access Network; Physical Layer Procedures (TDD) (Release 1999)," 3GPP TS 25.224 V3.8.0 (Sep. 2001).

3GPP, "3rd Generation Partnership Project; Technical Specification Group Radio Access Network; Physical Layer Procedures (TDD) (Release 4)," 3GPP TS 25.224 V4.2.0 (Sep. 2001).

3GPP, "3rd Generation Partnership Project; Technical Specification Group Radio Access Network; Physical Layer Procedures (TDD) (Release 4)," 3GPP TS 25.224 V4.0.0 (Mar. 2001).

3GPP, "3rd Generation Partnership Project; Technical Specification Group Radio Access Network; UTRA High Speed Downlink Packet Access (HSDPA); Overall description; Stage 2 (Release 5)," 3GPP TS 25.308 V5.0.0 (Sep. 2001).

3GPP, "3rd Generation Partnership Project; Technical Specification Group Radio Access Network; Physical layer procedures (FDD) (Release 4)," 3GPP TS 25.214 V4.0.0 (Mar. 2001).

3GPP, "3rd Generation Partnership Project; Technical Specification Group Radio Access Network; Physical layer procedures (FDD) (Release 1999)," 3GPP TS 25.214 V3.8.0 (Sep. 2001).

3GPP, "3rd Generation Partnership Project; Technical Specification Group Radio Access Network; Physical layer procedures (FDD) (Release 1999)," 3GPP TS 25.214 V3.6.0 (Mar. 2001).

3GPP, "3rd Generation Partnership Project; Technical Specification Group Radio Access Network; Physical layer procedures (FDD) (Release 4)," 3GPP TS 25.214 V4.2.0 (Sep. 2001).

3GPP, "3rd Generation Partnership Project; Technical Specification Group Radio Access Network; Multiplexing and channel coding (TDD) (Release 4)," 3GPP TS 25.222 V4.1.0 (Sep. 2001).

3GPP, "3rd Generation Partnership Project; Technical Specification Group Radio Access Network; Multiplexing and channel coding (TDD) (Release 4)," 3GPP TS 25.222 V4.0.0 (Mar. 2001).

3GPP, "3rd Generation Partnership Project; Technical Specification Group Radio Access Network; Multiplexing and channel coding (TDD) (Release 1999)," 3GPP TS 25.222 V3.7.0 (Sep. 2001).

3GPP, "3rd Generation Partnership Project; Technical Specification Group Radio Access Network; Multiplexing and channel coding (TDD) (Release 1999)," 3GPP TS 25.222 V3.6.0 (Mar. 2001).

3GPP, "3rd Generation Partnership Project; Technical Specification Group Radio Access Network; UTRAN lub Interface NBAP signaling (Release 1999)," 3GPP TS 25.433 V3.7.0 (Sep. 2001).

3GPP, "3rd Generation Partnership Project; Technical Specification Group Radio Access Network; UTRAN lub Interface NBAP signaling (Release 1999)," 3GPP TS 25.433 V3.5.0 (Mar. 2001).

3GPP, "3rd Generation Partnership Project; Technical Specification Group Radio Access Network; UTRAN lub Interface NBAP signaling (Release 4)," 3GPP TS 25.433 V4.0.0 (Mar. 2001).

3GPP, "3rd Generation Partnership Project; Technical Specification Group Radio Access Network; UTRAN lub Interface NBAP signaling (Release 4)," 3GPP TS 25.433 V4.2.1 (Sep. 2001).

3GPP, "3rd Generation Partnership Project; Technical Specification Group Radio Access Network; RRC Protocol Specification (Release 4)," 3GPP TS 25.331 V4.2.1 (Oct. 2001).

3GPP, "3rd Generation Partnership Project; Technical Specification Group Radio Access Network; RRC Protocol Specification (Release 1999)," 3GPP TS 25.331 V3.6.0 (Mar. 2001).

3GPP, "3rd Generation Partnership Project; Technical Specification Group Radio Access Network; RRC Protocol Specification (Release 4)," 3GPP TS 25.331 V4.0.0 (Mar. 2001).

* cited by examiner

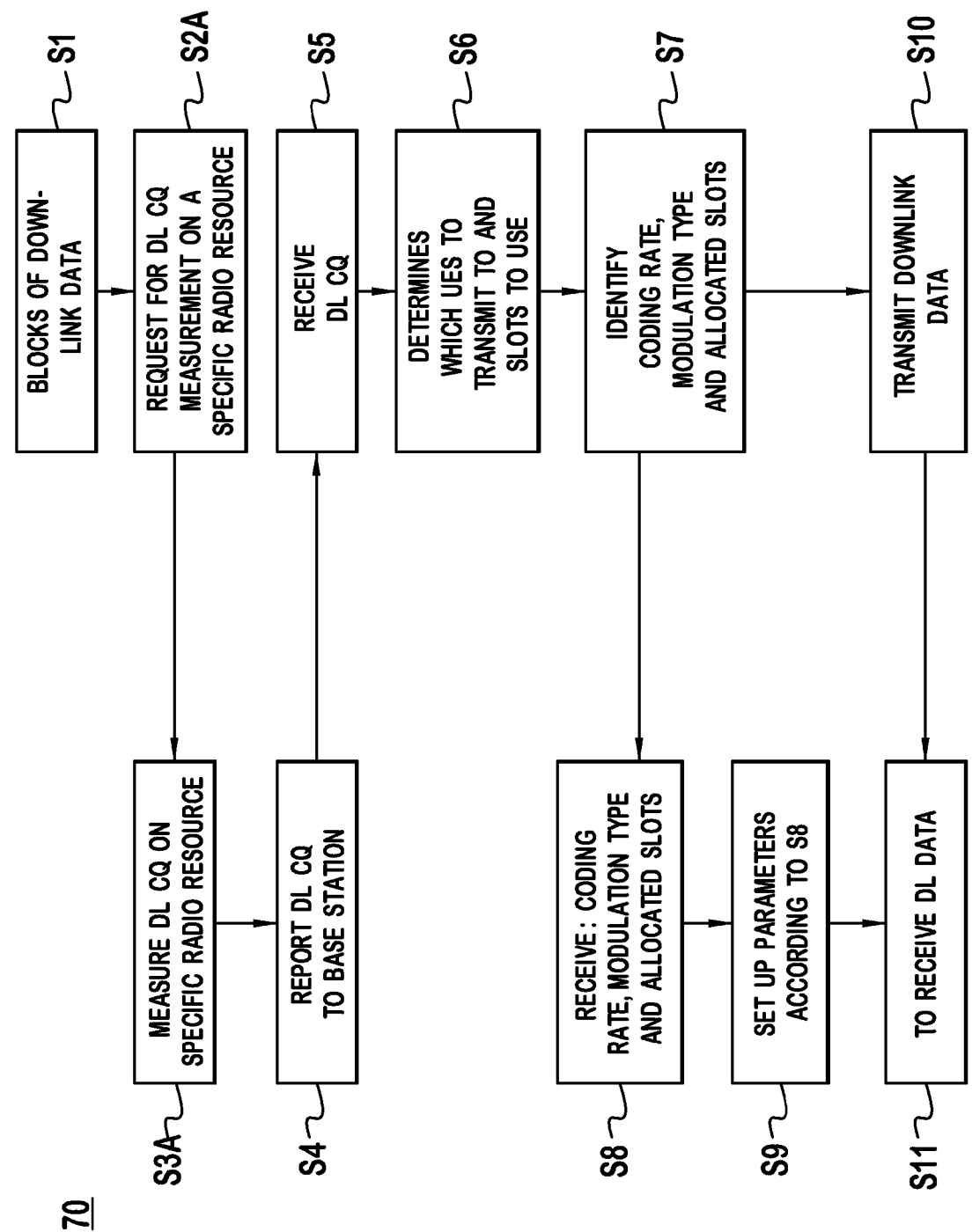

DYNAMIC CHANNEL QUALITY MEASUREMENT PROCEDURE IMPLEMENTED IN A WIRELESS DIGITAL COMMUNICATION SYSTEM TO PRIORITIZE THE FORWARDING OF DOWNLINK DATA

CROSS REFERENCE TO RELATED APPLICATIONS

This application is a continuation of U.S. patent application Ser. No. 11/656,647, filed Jan. 23, 2007, now U.S. Pat. No. 7,639,989, which is a continuation of Ser. No. 10/768,312, filed Jan. 30, 2004, now U.S. Pat. No. 7,171,163, which is a continuation of U.S. patent application Ser. No. 10/029,569, filed Dec. 21, 2001, now U.S. Pat. No. 6,810,236, which claims the benefit of U.S. Provisional Patent Application No. 60/290,877, filed May 14, 2001, which applications are incorporated herein by reference.

BACKGROUND

The present invention relates to wireless digital communication systems. More particularly, the present invention relates to communication stations which employ code-division multiple access (CDMA) technology. Specifically, the present invention relates to determining radio conditions for use in optimizing radio resource utilization as well as selecting data rates for user services.

In code-division multiple access (CDMA) third generation (3G) cellular telecommunication systems, adaptive modulation and coding (AM&C) techniques are applied to transmissions in order to achieve improved radio resource utilization and provide increased data rates for user services under appropriate conditions. These AM&C techniques take into account radio conditions in advance of transmissions in order to determine modulation and coding rates that take the greatest advantage of current radio propagation conditions utilizing these techniques.

Utilizing these AM&C techniques, a procedure is required that provides a physical channel quality measurement from the receiver in advance of each transmission. Based on this quality measurement, the transmitter determines the appropriate modulation and coding rate for the particular transmission.

In CDMA systems, as with any wireless systems, radio conditions can change rapidly due to a wide variety of both natural and man-made conditions. Since the channel quality measurement is used to determine transmission modulation and coding, and since channel quality changes rapidly due to the changing conditions of the transmission path, the performance of the adaptive transmission process is directly related to the length of the time period between when the channel quality measurement is performed and when the transmission is initiated.

Physical or logical control channels are then used to transfer the channel quality measurements from the receiver to the transmitter. Channel quality signaling may utilize either dedicated control channels to each user equipment (UE) or common control channels shared by all UEs. A UE may be a cellular phone, PDA (personal data assistant) or any other type of wireless device. When dedicated control channels are used, a continuous signaling channel is available over time for propagation of channel quality measurements for each UE. This is an optimal solution for AM&C since the quality measurement is continuously available. Transmissions can occur at any time, taking into account the continuously available quality measurement for appropriate modulation and coding settings. Additionally, with a dedicated control channel always available in the uplink, the channel can be also used to support low rate uplink data transmissions.

The difficulty with the dedicated control channel approach is that physical resources are continuously allocated even when there is no data to transmit. A primary application of AM&C techniques is non-real time high data rate services, for example, Internet access. For these classes of service, the best quality of service (QoS) is achieved with short, high rate transmissions with relatively long idle periods between each transmission. These long idle periods result in an inefficient use of dedicated resources.

The problem can be minimized with pre-configured periodic dedicated channel allocations. But this results in periodic availability of quality measurements. If the quality measurements are not continuously available, for UEs which have transmissions at any one point in time, only some portion of the UEs will have recent channel quality measurements.

Another alternative is the use of common control channels. With common control channels, a continuous signaling channel exists that is shared between all UEs within the cell. Procedures are defined for determining each UEs access to the common control channel. UE identities are used to distinguish UE specific transactions.

The difficulty with the common control approach for support of AM&C is the large amount of signaling overhead necessary to administrate each UE's access to the control channel. As aforementioned, UE identities are required to distinguish UE specific transactions. Additionally, to avoid contention-based access to the uplink common control channel, individual allocations are required to be signaled on the downlink common control channel for each UE's access. Since uplink transmissions cannot always be predicted, periodic allocations of the uplink control channel must be signaled on the downlink common control channel, which results in considerable signaling overhead. Also, the common control approach does not provide for low rate, uplink data transmissions.

In summary, the efficient performance of AM&C techniques is primarily based on the availability of recent physical channel quality measurements from the receiver in advance of each transmission. Optimally, measurements are available with minimal latency for all users with active data transmissions. The dedicated control channel solution provides continuous measurements, but since transmissions are discontinuous, this is an inefficient use of radio resources. Periodic configured dedicated control channels minimize the radio resource requirement, but this increases measurement latency. The common control channel method can provide measurements on a continuous or periodic basis, but the signaling overhead results in an inefficient use of radio resources.

There exists a need for a system that provides channel quality measurements with low latency and low signaling overhead.

BRIEF DESCRIPTION OF THE DRAWING(S)

The objectives of the present invention will become apparent upon consideration of the accompanying detailed description and figures, in which:

FIG. 2 shows an alternative embodiment of the DCQMP of the present invention shown in FIG. 1.

DETAILED DESCRIPTION OF THE PREFERRED EMBODIMENT(S)

Figure 1:
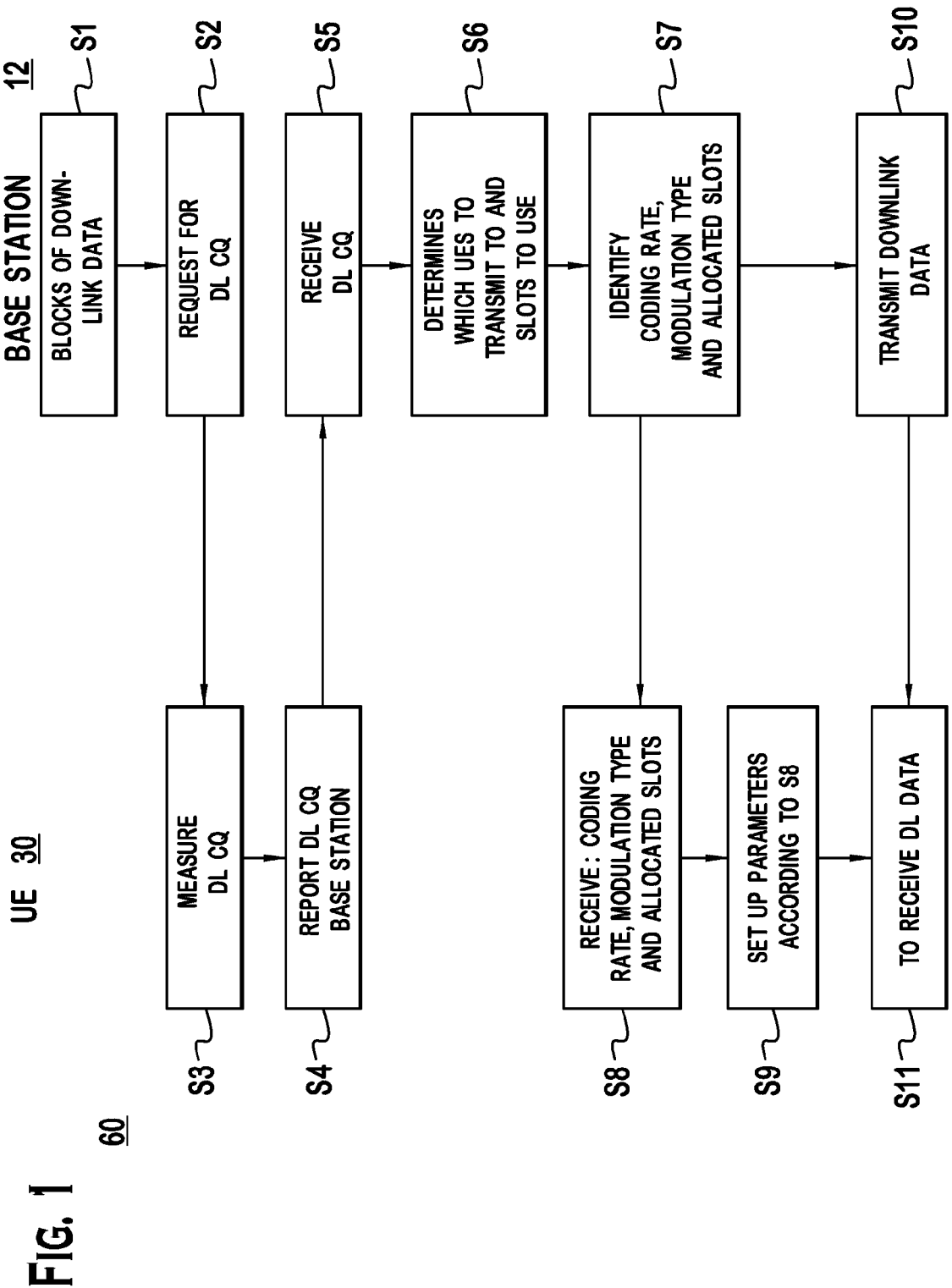
FIG. 1 is a flow chart illustrating one preferred Dynamic Channel Quality Measurement Procedure (DCQMP) of the present invention.

Presently preferred embodiments are described below with reference to the drawing figures wherein like numerals represent like elements throughout.

FIG. 1 is a flow diagram which illustrates the dynamic channel quality (CQ) measurement procedure 60 of the present invention which may be implemented by a wireless digital communication system having a base station/node B (hereinafter base station 12) which communicates with at least one UE 30. Although it is intended for the presently inventive method to support communications between a base station and a plurality of UEs, for simplicity the following description will detail the steps performed by a single UE, it being understood that other UEs will operate in a similar manner.

Blocks of downlink (DL) data are transferred to the base station 12 which are designated for a particular UE 30 (step S1).

The base station 12, responsive to receipt of downlink data and in advance of a transmission to the UE 30, requests DL CQ measurements only from a UE 30 having pending downlink transmissions (step S2).

The UE 30 receives the request and makes the requested CQ measurement at step S3 and reports the DL CQ measurement to the base station 12 at step S4.

Based on the CQ measurement reports received from each UE (step S5), the base station 12 determines which of the UEs will make the best use of radio resources, and determines which slots to use (step S6). Preferably, the UEs are prioritized by their CQ so that the UE with the highest CQ is sent its data first and then the UE with the second highest CQ is sent its data second, and so on until the UE with the lowest CQ is sent its data last.

Since the CQ measurement requests and the responsive CQ measurement reports are only generated when needed, the signaling overhead required for a common control channel is greatly reduced. Measurement reports are available for all active transmitting users, similar to the dedicated control channel case, but avoiding the resource inefficiency during idle periods.

The priority of transmissions is determined according to the DL CQ measurements, and the DL physical channel allocation is signaled to the appropriate UEs, indicating the particular coding rate, modulation type and allocated slots (step S7). The designated UE receives the coding rate, modulation type and allocated slots (step S8), and sets these parameters for reception (step S9).

Blocks of downlink data are then transmitted by the base station 12 to the designated UE 30 (step S10) a given, but short, time after performance of step S7 to enable the UE 30 time to set up for reception. The UE 30 receives the downlink data (step S11) at the specified coding rate, modulation type and in the allocated slots specified at step S7.

The present invention thus provides the fundamental requirements for AM&C operation while maintaining the most efficient use of radio resources. Since DL CQ measurements are available with the minimum possible latency for all transmissions, the choice of the best user(s) to provide service in the next transmission time frame is optimized. Additionally, measurements provided by periodic or continuous mechanisms do not provide increased benefit, performance gain or enhancement over the present invention.

Implementation of the present invention also minimizes measurement processing and the associated power consumption, especially important in the UE, which is typically powered by a small power source of limited capacity, (i.e. a chargeable battery). Since a quality measurement is only requested for a particular active transmission, the number of required measurements are minimized.

In accordance with an alternative embodiment of the method 70 of the present invention shown in FIG. 2, only certain quality measurements may be required depending on the radio resources used for a particular transmission. For example, in the 3G standards, the CQ for only specific physical timeslots may be requested. Therefore, the number of measurements performed is reduced by limiting the requirement of a CQ measurement to only active transmissions and, depending on the scale of the transmission, only requiring measurement on particular radio resources, (i.e., specific time slots). This is shown in FIG. 2, which is similar to FIG. 1 except for modified steps S2A and S3A, which replace steps S2 and S3 respectively of FIG. 1. In step S2A, the base station 12 requests the UE 30 to perform a measurement only on a particular radio resource. In response, the UE performs the DL CQ measurement on the specified radio resource (step S3A).

The present invention provides many advantages over prior art schemes. First, the invention provides the highest efficiency utilization of the air interface since only those UEs having pending transmissions will be required to respond to a request for DL CQ measurements. This permits the overhead signaling to be at a minimum.

Second, since the transmissions are prioritized according to the highest quality DL CQ measurements, the highest data rates permissible will be achieved for each time slot or multiple time slots.

Third, since UEs are only required to respond to the request for the DL CQ measurements, unnecessary measurements by the UEs will not be required, thereby saving the battery life of the UEs.

A final advantage of the present invention is the increased number of users that may be supported in a cell for both of the methods disclosed herein. The number of users that are supported is limited in the dedicated control channel method by the requirement for dedicated radio resources; and in the common control channel method by signaling overhead requirements. By limiting the measurement signaling procedures to active users, the present invention minimizes the common control signaling overhead and supports the greatest number of users in the cell.

While the present invention has been described in terms of the preferred embodiment, other variations which are within the scope of the invention as outlined in the claims below will be apparent to those skilled in the art.

What is claimed is:

1. A method for receiving downlink control information, the method comprising:
   receiving by a user equipment (UE) a request to provide a channel quality (CQ) measurement report;
   transmitting by the UE a CQ measurement report in response to the request;
   receiving by the UE downlink control information including an allocation of resources, wherein the downlink control information is distinguished by a UE identity (ID) associated with the UE; and
   receiving by the UE downlink data in accordance with the allocation of radio resources.

2. The method of claim 1 wherein the allocation of radio resources includes at least one of a coding rate and a modulation type.

3. The method of claim 1 wherein the request to provide a CQ measurement report is received over a common control channel or a dedicated control channel.

4. The method of claim 1 wherein the request to provide a CQ measurement report indicates at least one particular radio resource upon which the CQ measurement is to be based.

5. The method of claim 1 wherein the allocation of radio resources is based on the transmitted CQ measurement report.

6. A user equipment mobile terminal (UE) comprising:
- a receiver configured to receive a request to provide a channel quality (CQ) measurement report;
- a transmitter configured to transmit a CQ measurement report in response to the request; and
- the receiver further configured to receive UE downlink control information including an allocation of resources, wherein the downlink control information is distinguished by a UE identity (ID) associated with the UE, and to receive downlink data in accordance with the allocation of radio resources.

7. The UE of claim 6 wherein the allocation of radio resources includes at least one of a coding rate, and a modulation type.

8. The UE of claim 6 wherein each request to provide a CQ measurements report is transmitted over a common control channel or a dedicated control channel.

9. The UE of claim 6 wherein the request to provide a CQ measurements report indicates at least one radio resource upon which the CQ measurements report is to be based.

10. The UE of claim 6 wherein the allocation of radio resources is based on the transmitted CQ measurement report.

* * * * *

UNITED STATES PATENT AND TRADEMARK OFFICE
CERTIFICATE OF CORRECTION

| | | |
|---|---|---|
| PATENT NO. | : 7,904,026 B2 | Page 1 of 1 |
| APPLICATION NO. | : 12/648470 | |
| DATED | : March 8, 2011 | |
| INVENTOR(S) | : Terry et al. | |

It is certified that error appears in the above-identified patent and that said Letters Patent is hereby corrected as shown below:

ON THE TITLE PAGE

At Section (56) U.S. PATENT DOCUMENTS, page 2, left column, after "6,850,540 B1 2/2005 Peisa et al.", insert --6,868,277 3/2005 Cerwall et al.--.

At Section (56) FOREIGN PATENT DOCUMENTS, page 2, right column, after "WO 02/093951 11/2002", insert --WO 02/032179 4/2002--.

IN THE SPECIFICATION

At column 2, line 24, after "determining each", delete "UEs" and insert --UE's--.

IN THE CLAIMS

At Claim 8, column 6, line 9, before "report", delete "measurements" and insert --measurement--.

At Claim 9, column 6, line 13, after "CQ", delete "measurements" and insert --measurement--.

Signed and Sealed this
Fourteenth Day of February, 2012

David J. Kappos
*Director of the United States Patent and Trademark Office*